United States Patent
Burroughs et al.

(10) Patent No.: US 7,447,833 B2
(45) Date of Patent: *Nov. 4, 2008

(54) TECHNIQUES FOR PROVIDING COMMUNICATIONS IN A DATA STORAGE SYSTEM USING A SINGLE IC FOR BOTH STORAGE DEVICE COMMUNICATIONS AND PEER-TO-PEER COMMUNICATIONS

(75) Inventors: John V. Burroughs, East Sandwich, MA (US); Matthew Long, Uxbridge, MA (US)

(73) Assignee: EMC Corporation, Hopkinton, MA (US)

( * ) Notice: Subject to any disclaimer, the term of this patent is extended or adjusted under 35 U.S.C. 154(b) by 302 days.

This patent is subject to a terminal disclaimer.

(21) Appl. No.: 11/169,473

(22) Filed: Jun. 29, 2005

(65) Prior Publication Data

US 2007/0005880 A1    Jan. 4, 2007

(51) Int. Cl.
 *G06F 12/00* (2006.01)
(52) U.S. Cl. ........................ 711/112; 711/114
(58) Field of Classification Search .............. 711/112, 711/114
See application file for complete search history.

(56) References Cited

U.S. PATENT DOCUMENTS

| | | | |
|---|---|---|---|
| 6,831,831 B2 | 12/2004 | Bicknell et al. | 361/685 |
| 6,915,381 B2 | 7/2005 | Fujie et al. | 711/114 |
| 7,162,576 B2 | 1/2007 | Mizuno et al. | |
| 2003/0110330 A1* | 6/2003 | Fujie et al. | 710/36 |
| 2004/0024950 A1 | 2/2004 | Surugucchi | 710/316 |
| 2004/0083324 A1 | 4/2004 | Rabinovitz et al. | 710/315 |
| 2004/0236908 A1 | 11/2004 | Suzuki et al. | 711/114 |
| 2005/0235072 A1* | 10/2005 | Smith et al. | 710/22 |
| 2006/0242380 A1* | 10/2006 | Korgaonkar et al. | 711/170 |

FOREIGN PATENT DOCUMENTS

| | | |
|---|---|---|
| EP | 0967552 A2 | 12/1999 |
| EP | 1357486 A2 | 10/2003 |

OTHER PUBLICATIONS

International Search Report, mailed Jul. 27, 2006.
Burroughs, John V., et al., U.S. Appl. No. 11/324,973, filed on Jan. 3, 2006, entitled "Managing Serial Attached Small Computer Systems Interface Communications".

* cited by examiner

*Primary Examiner*—Reginald G Bragdon
*Assistant Examiner*—Aracelis Ruiz
(74) *Attorney, Agent, or Firm*—BrainwoodHuang

(57) ABSTRACT

An improved data storage system has a set of storage devices, a first storage processor and a second storage processor for storing data into and retrieving data from the set of storage devices. The first storage processor includes a processing circuit and a packaged IC device which has a first set of ports and a second set of ports. The processing circuit is adapted to configure the packaged IC device to provide (i) communications to the set of storage devices through the first set of ports and (ii) other communications to the second storage processor through the second set of ports. The processing circuit is further adapted to pass communications between the first storage processor and the set of storage devices through the first set of ports; and pass communications between the first storage processor and the second storage processor through the second set of ports.

17 Claims, 4 Drawing Sheets

TECHNIQUES FOR PROVIDING COMMUNICATIONS IN A DATA STORAGE SYSTEM USING A SINGLE IC FOR BOTH STORAGE DEVICE COMMUNICATIONS AND PEER-TO-PEER COMMUNICATIONS

BACKGROUND

A typical data storage system includes storage processing circuitry and an array of disk drives. The storage processing circuitry stores data into and retrieves data from the array of disk drives on behalf of external host computers. In some conventional data storage systems, the storage processing circuitry includes a Serial ATA interface (SATA) integrated circuit (IC) which communicates with the array of disk drives using the SATA protocol. The SATA IC enables the storage processing circuitry to operate as a SATA initiator by providing SATA commands to the array of disk drives. The array of disk drives operates as a set of SATA targets by responding to the SATA commands (e.g., by reading and writing data in response to the SATA commands).

One conventional data storage system includes two storage processors for high availability. Each storage processor includes a respective SATA IC having a send port and a receive port for each disk drive. Accordingly, if one storage processor fails, the other storage processor has access to each disk drive and can attempt to continue operation.

In the above-described conventional data storage system, each storage processor further includes a parallel bus device which is separate from the SATA IC of that storage processor. A direct memory access (DMA) engine of each storage processor then engages in DMA-based store and retrieve operations through the parallel bus devices to form a cache mirroring interface (CMI) path between the storage processors. As a result, each storage processor is capable of mirroring data in the cache of the other storage processor. With data mirrored in the caches, the storage processors are capable of operating in a write-back manner for improved response time (i.e., the storage processors are capable of committing to data storage operations as soon as the data is mirrored in both caches since the data remains available even if one storage processor fails).

Further details of various SATA specifications are available in a document entitled "Serial ATA II Electrical Specification," Revision 1.0, May 26, 2004, the teachings of which are hereby incorporated by reference in their entirety.

SUMMARY

Unfortunately, there are deficiencies to the above-described storage processors which use SATA ICs to communicate with the array of disk drives, and parallel bus devices to communicate with each other. For example, the use of SATA ICs for disk drive communications and separate parallel bus devices for CMI path communications is an inefficient use of printed circuit board (PCB) resources. In particular, these separate circuit board components require respective mounting locations, adjacent support circuits, and space for signal traces leading to and from these mounting locations and support circuits. Furthermore, since the storage processors carry out DMA operations through the parallel bus devices (i.e., for cache mirroring), additional design precautions must be taken to prevent a failure of one storage processor from locking the parallel bus device of the remaining storage processor and in turn hanging the remaining storage processor.

In contrast to the above-described conventional data storage system having storage processors with separate SATA ICs for SATA disk drive communications and parallel bus devices for DMA-based CMI path communications, improved techniques utilize a packaged IC device having a first set of ports for storage device communications and a second set of ports for peer-to-peer storage processor communications. That is, when this single IC is properly configured on a storage processor, this single IC is capable of operating as an interface to both (i) storage devices (e.g., for synchronizing cache memory with disk drive memory) and (ii) another storage processor (e.g., for cache mirroring between storage processors). Such techniques save PCB real estate as well as alleviate the need to provide parallel-bus DMA-based communications between storage processors.

One embodiment is directed to a data storage system having a set of storage devices, a first storage processor and a second storage processor for storing data into and retrieving data from the set of storage devices on behalf of a set of external host computers. The first storage processor includes a processing circuit and a packaged IC device which has a first set of ports and a second set of ports. The processing circuit is adapted to configure the packaged IC device to provide (i) communications to the set of storage devices through the first set of ports and (ii) other communications to the second storage processor through the second set of ports. The processing circuit is further adapted to pass communications between the first storage processor and the set of storage devices through the first set of ports of the packaged IC device; and pass communications between the first storage processor and the second storage processor through the second set of ports of the packaged IC device. Such an embodiment provides very efficient use of circuit board resources, and robust communications (e.g., SATA, Serial Attached SCSI, Fibre Channel, etc.) within the data storage system.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Improved techniques utilize a packaged integrated circuit (IC) device which has a first set of ports for storage device communications and a second set of ports for peer-to-peer storage processor communications. That is, when this single IC is properly configured on a storage processor, this single IC is capable of operating as an interface to both (i) storage devices (e.g., for synchronizing cache memory with disk drive memory) and (ii) another storage processor (e.g., for cache mirroring between storage processors). Such techniques save printed circuit board (PCB) real estate as well as alleviate the need to provide parallel-bus direct memory access based (DMA-based) communications between storage processors.

Figure 1:
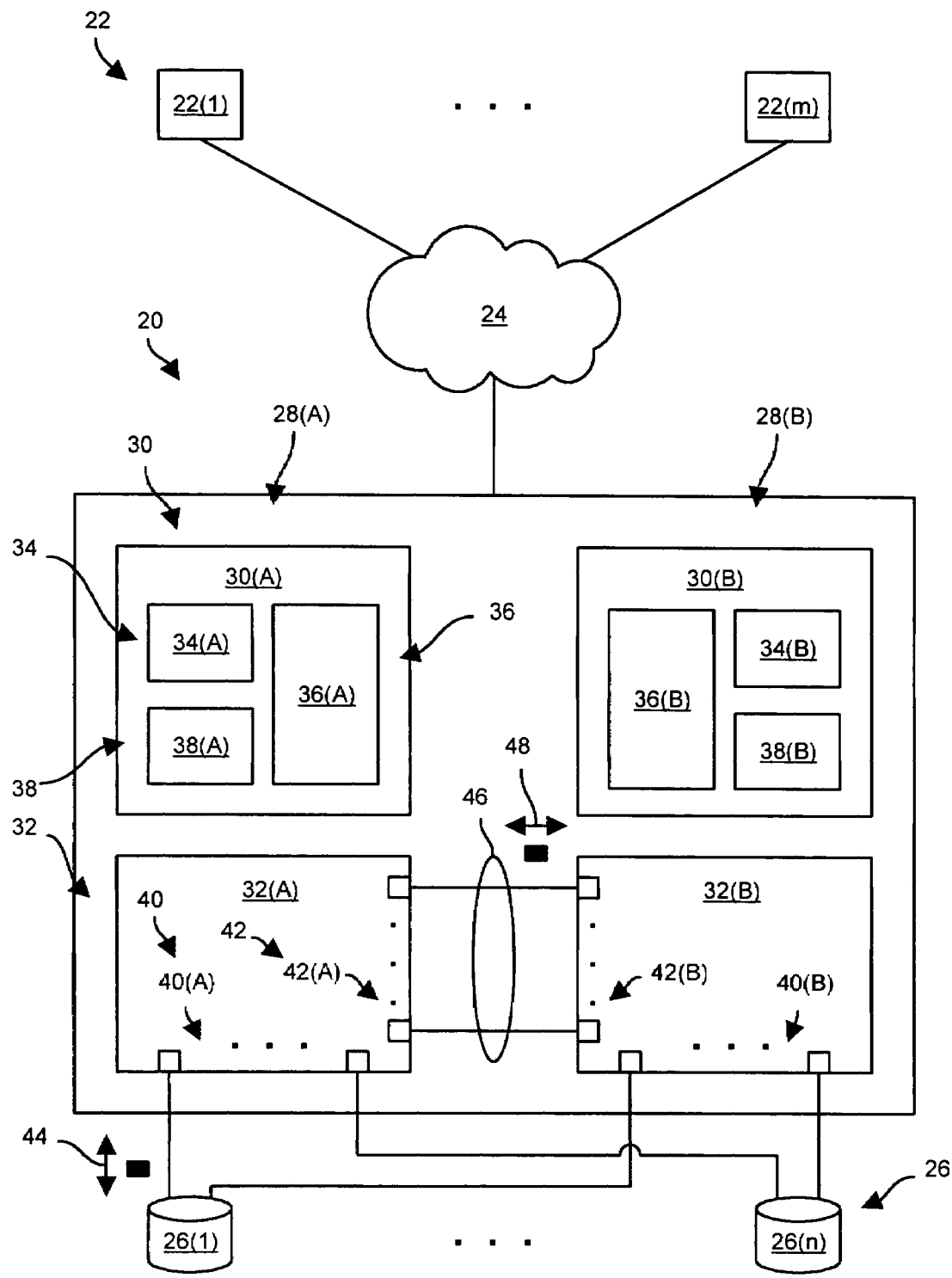
FIG. 1 is a block diagram of a data storage system having packaged IC devices for both storage device communications and peer-to-peer storage processor communications.

FIG. 1 shows a data storage system 20 which is configured to store and retrieve data on behalf of a set of external host computers 22(1), . . . , 22(m) (collectively, external host computers 22). The data storage system 20 is capable of connecting to the external host computers 22 through a network 24 (e.g., in a SAN-configuration, in a NAS-configuration, as part of a LAN, through the Internet, etc.).

As shown in FIG. 1, the data storage system 20 includes a set of storage devices 26(1), . . . , 26(n) (collectively, storage devices 26), a storage processor 28(A), and another storage processor 28(B) (collectively, storage processors 28). Each storage processor 28 includes, among other things, a processing circuit 30 and a packaged IC device 32. For example, the storage processor 28(A) includes a processing circuit 30(A) and a packaged IC device 32(A). Similarly, the storage processor 28(B) includes a processing circuit 30(B) and a packaged IC device 32(B). It should be understood that two storage processors 28 are shown by way of example only, and that other numbers of storage processors 28 are suitable for use by the data storage system 20 (e.g., three, four, and so on). Moreover, such storage processors 28 are capable of residing on a single PCB or on multiple PCBs.

Each processing circuit 30 includes a set of microprocessors 34 (i.e., one or more microprocessors), cache memory 36 and a direct memory access (DMA) engine 38. For example, the processing circuit 30(A) includes a set of microprocessors 34(A), a cache 36(A), and a DMA engine 38(A). Similarly, the processing circuit 30(B) includes a set of microprocessors 34(B), a cache 36(B), and a DMA engine 38(B). In some arrangements, at least a portion of the DMA engine 38 of each storage processor 28 is formed by one or more of the microprocessors 34 of that storage processor 28 running specialized software. In some arrangements, the DMA engines 38, or portions thereof, reside in the packaged IC devices 32 rather than in the processing circuits 30.

The packaged IC device 32 of each storage processor 28 includes a first set of ports 40 and a second set of ports 42. For example, the packaged IC device 32(A) of the storage processor 28(A) includes a first set of ports 40(A) and a second set of ports 42(A). Similarly, the packaged IC device 32(B) of the storage processor 28(B) includes a first set of ports 40(B) and a second set of ports 42(B). The first sets of ports 40(A), 40(B) connect to the set of storage devices 26 to enable the respective processing circuits 30(A), 30(B) to store and retrieve data 44 through the first sets of ports 40(A), 40(B). In some arrangements, the storage devices 26 are dual ported disk drives thus enabling the packaged IC device 32 of each storage processor 28 to have direct access (e.g., through the first ports 40 and associated cables) to each disk drive. The second sets of ports 42(A), 42(B) connect to each other (e.g., through circuit board traces, and perhaps connectors if the storage processors reside on separate PCBs) to provide peer-to-peer storage processor communications. In particular, the second sets of ports 42 connect with each other to form redundant cache mirroring interface (CMI) paths 46 for synchronizing data 48 within the caches 36. In some arrangements, each second set of ports 42(A), 42(B) includes exactly four ports to form two CMI links for fault tolerance.

During operation, the processing circuits 30 perform data storage operations on behalf of the host computers 22. In particular, the processing circuit 30(A) stores data into and retrieves data from the storage devices 26 in a non-volatile manner (e.g., see the arrow 44), and may temporarily cache that data within the cache 36(A). Additionally, the processing circuit 30(A) (i.e., the set of microprocessors 34(A) and the DMA engine 38(A)) mirrors the data cached within the cache 36(A) by copying that data into the cache 36(B) of the other storage processor 28(B) (e.g., see the arrow 48).

Similarly, the processing circuit 30(B) stores data into and retrieves data from the storage devices 26 in a non-volatile manner, and may temporarily cache that data within the cache 36(B). Furthermore, the processing circuit 30(B) (i.e., the set of microprocessors 34(B) and the DMA engine 38(B)) mirrors the data cached within the cache 36(B) by copying that data into the cache 36(A) of the other storage processor 28(A).

Further along these lines, the processing circuits 30 control the operation of the packaged IC devices 32. In particular, the processing circuit 30(A) configures the packaged IC device 32(A) to provide (i) communications to the storage devices 26 through the ports 40(A) and (ii) other communications to the other storage processor 28(B) through the ports 42(A). After such configuration, the processing circuit 30(A) passes communications (i.e., the data 44) to the storage devices 26 through the ports 40(A) of the packaged IC device 32(A) (i.e., accesses disk drives), and passes communications (i.e., the data 48) to other storage processor 28(B) through the ports 42(A) of the packaged IC device 32(A) (i.e., performs cache mirroring through the CMI pathways 46). Accordingly, the storage processor 28(A) does not require separate circuit board components to individually interface with disk drives and another storage processor 28 thus saving PCB resources.

Similar operations occur in the opposite direction. That is, the processing circuit 30(B) configures the packaged IC device 32(B) to provide (i) communications to the storage devices 26 through the ports 40(B) and (ii) other communications to the other storage processor 28(A) through the ports 42(B). After such configuration, the processing circuit 30(B) passes communications to the storage devices 26 through the ports 40(B) of the packaged IC device 32(B) (i.e., accesses disk drives), and passes communications to other storage processor 28(A) through the ports 42(B) of the packaged IC device 32(B) (i.e., performs cache mirroring through the CMI pathway). Accordingly, the data storage system 20 efficiently utilizes PCB resources (e.g., PCB real estate) using a single packaged IC device 32 on each storage processor 28 as the interface between that storage processor 28 and the storage devices 26 as well as between storage processors 28. Further details will now be provided with reference to FIGS. 2 and 3.

Figure 2:
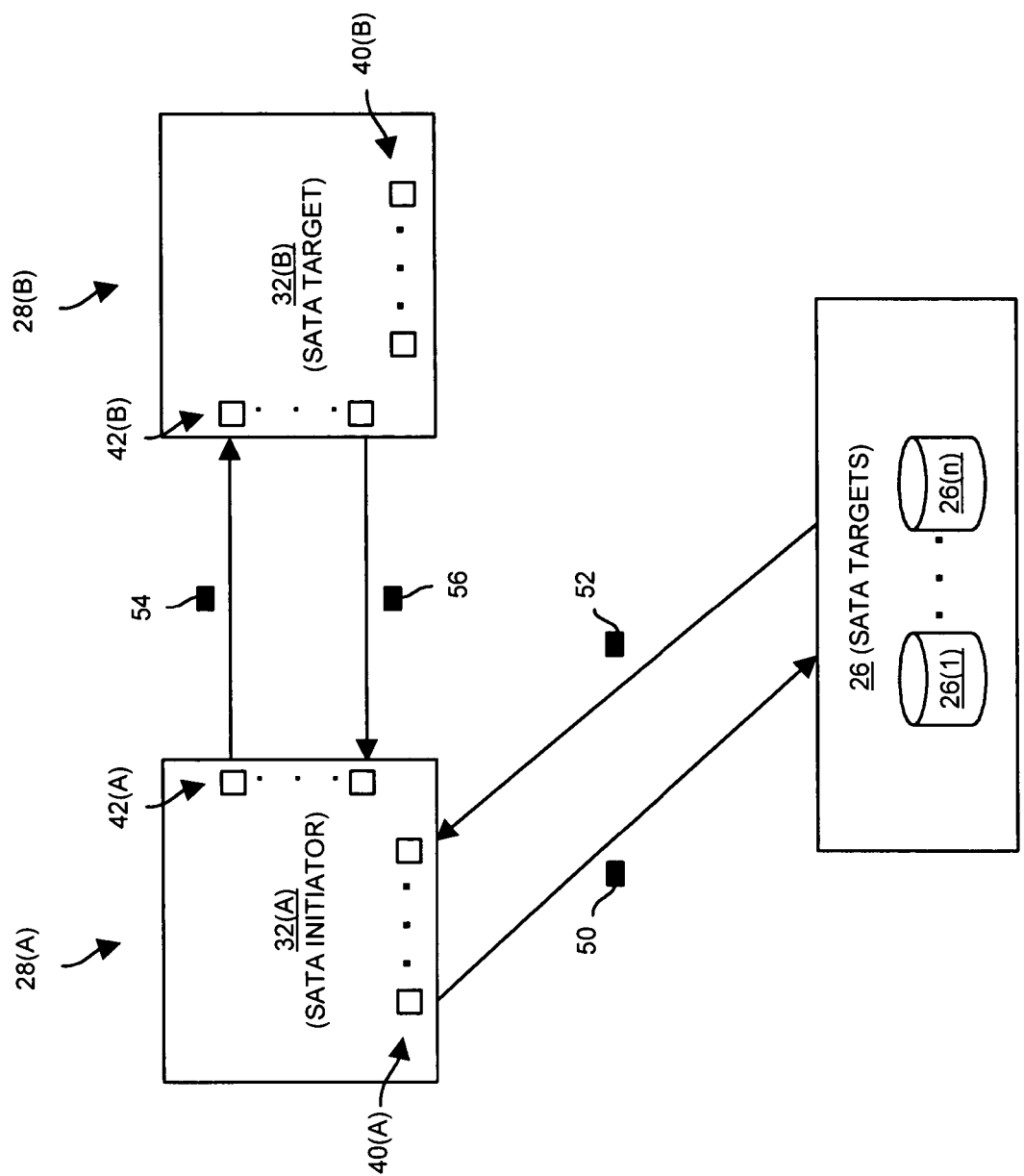
FIG. 2 is a block diagram illustrating operation of storage processors of the data storage system of FIG. 1.
Figure 3:
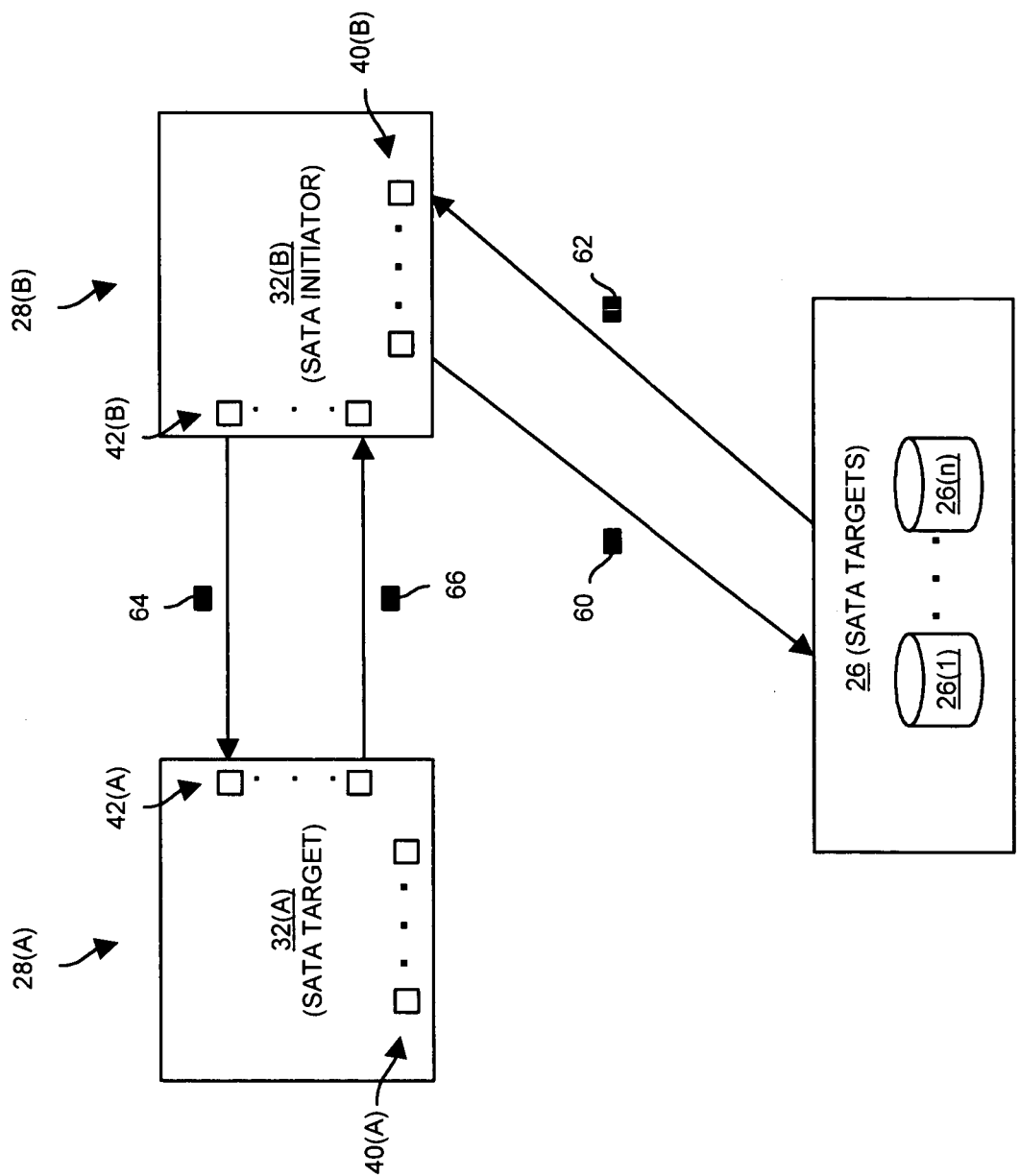
FIG. 3 is a block diagram illustrating further operation of storage processors of the data storage system of FIG. 1.

FIGS. 2 and 3 illustrate the capabilities of the package IC devices 32 of the storage processors 28 when the packaged IC devices 32 are implemented as single multi-port Serial ATA interface modules operating in accordance with the SATA protocol (e.g., SATA, SATA II, etc.). In particular, FIG. 2 shows the packaged IC device 32(A) operating as a SATA initiator with respect to each of the storage devices 26 as well as to the packaged IC device 32(B). Here, the packaged IC device 32(A) is capable of issuing read and write operations to the storage devices 26 by providing SATA commands 50 to the storage devices 26 through the ports 40(A) (also see the data 44 in FIG. 1). The storage devices 26 reply to the SATA commands 50, as SATA targets, by sending SATA responses 52 back to the ports 40(A) of the packaged IC device 32(A).

Similarly, FIG. 3 shows the packaged IC device 32(B) operating as a SATA initiator with respect to the storage devices 26 as well as to the packaged IC device 32(A). Here, the packaged IC device 32(B) is capable of issuing read and write operations to the storage devices 26 by providing SATA commands 60 to the storage devices 26 through the ports 40(B). The storage devices 26 reply to the SATA commands 60, as SATA targets, by sending SATA responses 62 back to the ports 40(B) of the packaged IC device 32(B).

Furthermore, the packaged IC devices 32(A), 32(B) are capable of operating as either a SATA initiator or a SATA target with respect to each other to form a valid CMI pathway. In particular, FIG. 2 shows the packaged IC device 32(A) issuing SATA commands 54 to the other storage processor 28(B). Along these lines, the packaged IC device 32(A) provides the SATA commands 54 to the packaged IC device 32(B) through the ports 42(A) of the packaged IC device 32(A) and through the ports 42(B) of the packaged IC device 32(B) (also see the data 48 in FIG. 1). The packaged IC device 32(B) replies to the SATA commands 54 (i.e., the packaged IC device 32(B) acts as a SATA target) by sending SATA responses 56 back to the packaged IC device 32(A) through the ports 42(B), 42(A). Additionally, as shown in FIG. 3, the packaged IC device 32(B) is similarly capable of issuing SATA commands 64 to the other storage processor 28(A). Along these lines, the packaged IC device 32(B) provides the SATA commands 64 to the packaged IC device 32(A) through the ports 42(B) of the packaged IC device 32(B) and through the ports 42(A) of the packaged IC device 32(A). The packaged IC device 32(A) replies to the SATA commands 64 (i.e., the packaged IC device 32(A) now acts as a SATA target) by sending SATA responses 66 back to the packaged IC device 32(B) through the ports 42(A), 42(B). Such peer-to-peer communications (i.e., the device 32(A) operating as a SATA initiator while the device 32(B) operates as a SATA target, and also the device 32(B) operating as a SATA initiator while the device 32(A) operates as a SATA target) forms a robust CMI pathway 46 between the storage processors 28 without the need for parallel-bus DMA-based communications through the CMI pathway as in conventional systems.

Based on the above description, it should be understood that, when the packaged IC devices 32 are implemented as single SATA packaged interfaces on each storage processor 28, each packaged IC device 32 is capable of operating as both a SATA initiator and a SATA target. In order to support operation as a SATA initiator, each packaged IC device 32 must be equipped to provide SATA commands to the storage devices 26 and receive SATA responses from the storage devices 26 in the traditional sense. In order to concurrently support operation as a SATA target, each packaged IC device 32 must be further equipped to receive SATA commands from the other packaged IC device 32 and provide SATA responses back to the other packaged IC device 32.

The above-described concurrent SATA initiator and SATA target functionality is achievable by adapting a multi-port SATA initiator device so that certain ports are capable of receiving, without error, a wider range of SATA signals than those of only SATA responses. Other techniques for configuring a single device to operate as both a SATA initiator and SATA target are suitable as well in order to overcome the fact that off-the-shelf SATA devices typically operate exclusively as SATA initiators or exclusively as SATA targets. In the context of the storage processors 28 (see FIG. 1), the processing circuits 30 disable the ports 42 from rigidly expecting only SATA responses (e.g., via programming a control register of the packaged IC devices 32), and thus enabling the ports 42 to receive SATA commands. At this point, suppose that a port 42(A) of a packaged IC device 32(A) of a storage processor 28(A) receives a SATA command from the packaged IC device 32(B) of the other storage processor 28(B). In order to attend to the SATA command, that port 42(A) can simply convey the SATA command through to the processing circuit 30(A). The processing circuit 30(A) can then handle the SATA command (e.g., perform a cache mirroring operation) and then direct the packaged IC device 32(A) to return a SATA response back to the storage processor 28(B).

It should be further understood that each packaged IC device 32 is thus capable of operating as both a SATA initiator and a SATA target in a substantially contemporaneous manner. That is, the packaged IC devices 32 are configured to perform the operations illustrated in FIGS. 2 and 3 at the same time in an ongoing manner. In particular, for each connected pair of ports 42, the port 42 on one device 32 operates as a SATA initiator while, on the opposite end, the port 42 on the other device 32 operates as a SATA target. Such operation enables each storage processor 28 of the data storage system 20 to employ a single circuit board component as its interface to both the storage devices 26 (for data storage and retrieval) and the other storage processor 28 (for cache mirroring). Moreover, since the DMA engines 38 are external to the packaged IC devices 32, the CMI path 46 does not need to carry parallel-bus DMA-based communications. Further details will now be provided with reference to FIG. 4.

Figure 4:
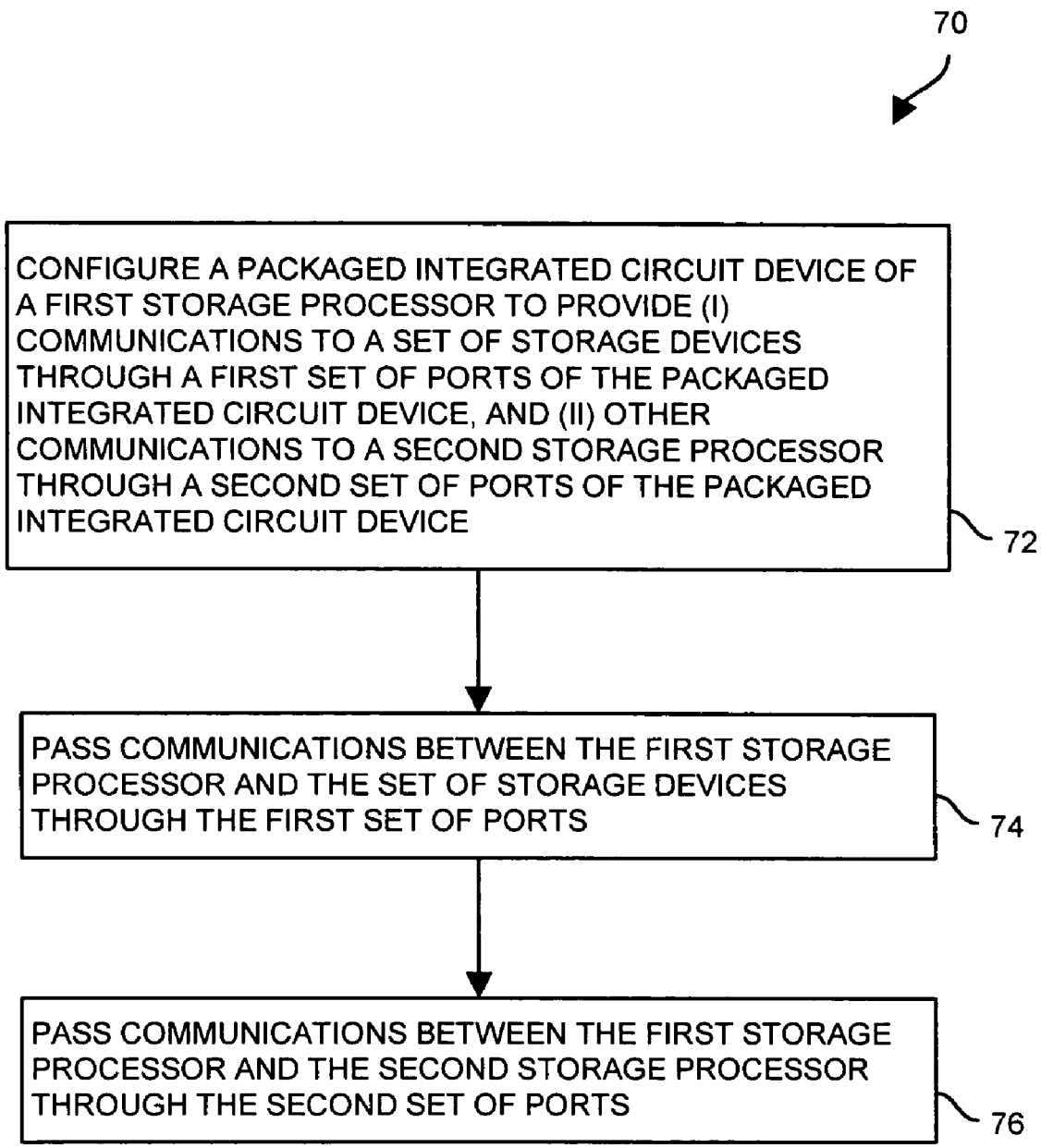
FIG. 4 is a flowchart illustrating a procedure performed by a processing circuit of one of the storage processors of the data storage system of FIG. 1.

FIG. 4 is a flowchart summarizing a procedure 70 performed by the processing circuit 30 of each storage processor 28 of the data storage system 20. In step 72, the processing circuit 30 (e.g., the processing circuit 30(A) in FIG. 1) configures a packaged integrated circuit device 32 (e.g., the device 32(A)) to provide (i) communications to the storage devices 26 through the ports 40 (e.g., ports 40(A)) of the packaged integrated circuit device 32 and (ii) other communications to the other storage processor 28 (e.g., the storage processor 28(B)) through the ports 42 (e.g., ports 42(A)) of the packaged integrated circuit device 32.

In step 74, the processing circuit 30 is now capable of passing communications 50, 52, 60, 62 between the storage processor 28 and the storage devices 26 through the ports 40. That is, the processing circuit 30 is now capable of storing data into and retrieving data from the storage devices 26.

In step 76, the processing circuit 30 is now capable of passing communications 54, 56, 64, 66 between the storage processor 28 and the other storage processor 28 through the ports 42. That is, the processing circuit 30 is now capable of mirroring cached data between the two storage processors 28 through the CMI path 46. It should be understood that steps 74 and 76 are capable of occurring substantially concurrently in an ongoing manner for robust data storage system operation.

As described above, improved techniques utilize a packaged IC device 32 having ports 40 for storage device communications and ports 42 for peer-to-peer storage processor communications. That is, when this single IC 32 is properly configured on a storage processor 28, this single IC 32 is capable of operating as an interface to both (i) storage devices 26 (e.g., for synchronizing cache memory with disk drive memory) and (ii) another storage processor 28 (e.g., for cache mirroring between storage processors). Such techniques save printed circuit board (PCB) real estate as well as alleviate the need to provide parallel-bus DMA-based communications between storage processors 28.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the packaged IC devices 32 were described above as employing the SATA protocol (e.g., SATA I or SATA II), but that other protocols are suitable for use as well. In other arrangements, packaged IC devices 32 use protocols other than SATA such as Serial Attached SCSI (SAS), Fibre Channel (FC), and the like.

Additionally, it should be understood that each storage processor 28 was described above as including only one packaged IC device 32 by way of example only. In other arrangements, each storage processor 28 has multiple packaged IC devices 32. In some arrangements, a first CMI path 46 extends across a first pair of packaged IC devices 32, and a second CMI path 46 extends across a second pair of packaged IC devices 32 for further fault tolerance.

What is claimed is:

1. Data storage equipment, comprising: a first storage processor; a second storage processor; and an interconnect coupled between the first and second storage processors, the first storage processor including a processing circuit and a packaged integrated circuit device which has a first set of ports and a second set of ports, the processing circuit of the first storage processor being adapted to: configure the packaged integrated circuit device of the first storage processor to provide (i) communications to a set of storage devices through the first set of ports of the packaged integrated circuit device and (ii) other communications to the second storage processor through the second set of ports of the packaged integrated circuit device; pass communications between the first storage processor and the set of storage devices through the first set of ports of the packaged integrated circuit device; and pass communications between the first storage processor and the second storage processor through the second set of ports of the packaged integrated circuit device; the packaged integrated circuit device being configured to operate concurrently as a SATA initiator through one port and as a SATA target through another port; the second storage processor including another packaged integrated circuit device; and wherein the first and second storage processors are adapted to perform direct memory access (DMA) operations outside of multiple cache mirroring interface (CMI) links to isolate the packaged integrated circuit devices from DMA operations.

2. Data storage equipment as in claim 1 wherein the processing circuit, when passing communications between the first storage processor and the set of storage devices, is adapted to:
   store data into and retrieving data from the set of storage devices through the first set of ports of the packaged integrated circuit device on behalf of a set of external host computers.

3. Data storage equipment as in claim 2 wherein the first and second storage processors include respective caches; and wherein the processing circuit, when passing communications between the first storage processor and the second storage processor, is adapted to:
   exchange data between the first and second processors through the second set of ports of the packaged integrated circuit device to mirror the respective caches of the first and second processors.

4. Data storage equipment as in claim 3 wherein the set of storage devices includes disk drives; and wherein the processing circuit, when storing data into and retrieving data from the set of storage devices through the first set of ports of the packaged integrated circuit device, is adapted to:
   operate the packaged integrated circuit device as a Serial ATA (SATA) initiator device with respect to the disk drives to control the disk drives as SATA target devices.

5. Data storage equipment as in claim 4 wherein the second storage processor includes another packaged integrated circuit device which is configured to operate as a SATA initiator device with respect to the disk drives to control the disk drives as SATA target devices; and wherein the processing circuit, when passing communications between the first storage processor and the second storage processor through the second set of ports of the packaged integrated circuit device, is adapted to:
   operate the packaged integrated circuit device of the first storage processor as a SATA initiator device with respect to the other packaged integrated circuit device of the second storage processor to command the other packaged integrated circuit device of the second storage processor as a SATA target device.

6. Data storage equipment as in claim 5 wherein the processing circuit, when passing communications between the first storage processor and the second storage processor through the second set of ports of the packaged integrated circuit device, is further adapted to:
   operate the packaged integrated circuit device of the first storage processor as a SATA target device with respect to the other packaged integrated circuit device of the second storage processor to respond to the other packaged integrated circuit device of the second storage processor when the other packaged integrated circuit device of the second storage processor operates as a SATA initiator device to provide peer-to-peer communications between the first and second storage processors.

7. Data storage equipment as in claim 4 wherein the second storage processor includes another packaged integrated circuit device which is configured to operate as a SATA initiator device with respect to the disk drives to control the disk drives as SATA target devices; and wherein the processing circuit, when passing communications between the first storage processor and the second storage processor through the second set of ports of the packaged integrated circuit device, is adapted to:
   operate the packaged integrated circuit device of the first storage processor as a SATA target device with respect to the other packaged integrated circuit device of the second storage processor to respond to the other packaged integrated circuit device of the second storage processor when the other packaged integrated circuit device of the second storage processor operates as a SATA initiator device.

8. Data storage equipment as in claim 7 wherein the processing circuit, when configuring the packaged integrated circuit device of the first storage processor, is adapted to:
   disable a mechanism, which otherwise forces the packaged integrated circuit device of the first storage processor to operate as a SATA initiator device, to allow the packaged integrated circuit device of the first storage processor to operate as the SATA target device with respect to the other packaged integrated circuit device of the second storage processor.

9. Data storage equipment as in claim 1, wherein the processing circuit of the first storage processor, when configuring the packaged integrated circuit device of the first storage processor, is adapted to:
   program (i) the first set of ports of the packaged integrated circuit device of the first storage processor to provide multiple communication paths to the disk drives and (ii) the second set of ports of the packaged integrated circuit device of the first storage processor to provide multiple cache mirroring interface (CMI) links to the second storage processor; and
   wherein the processing circuit of the first storage processor is adapted to mirror cached data between the first storage processor and the second storage processor via the CMI links formed between the second set of ports of the packaged integrated circuit device of the first storage processor and the second storage processor.

10. A method for providing communications within a data storage system having a first storage processor, a second storage processor, and a set of storage devices, the method comprising: configuring a packaged integrated circuit device of the first storage processor to provide (i) communications to the set of storage devices through a first set of ports of the packaged integrated circuit device and (ii) other communications to the second storage processor through a second set of ports of the packaged integrated circuit device; passing communications between the first storage processor and the set of storage devices through the first set of ports of the packaged integrated circuit device; and passing communications between the first storage processor and the second storage processor through the second set of ports of the packaged integrated circuit device; wherein the set of storage devices includes disk drives; wherein storing data into and retrieving data from the set of storage devices through the first set of ports of the packaged integrated circuit device includes operating the packaged integrated circuit device as a Serial ATA (SATA) initiator device with respect to the disk drives to control the disk drives as SATA target devices; wherein configuring the packaged integrated circuit device of the first storage processor further includes programming (i) the first set of ports of the packaged integrated circuit device of the first storage processor to provide multiple communication paths to the disk drives and (ii) the second set of ports of the packaged integrated circuit device of the first storage processor to provide multiple cache mirroring interface (CMI) links to the second storage processor; and further comprising operating the packaged integrated circuit device concurrently as a SATA initiator through one port and as a SATA target through another port.

11. A method as in claim 10 wherein passing communications between the first storage processor and the set of storage devices includes:
    storing data into and retrieving data from the set of storage devices through the first set of ports of the packaged integrated circuit device on behalf of a set of external host computers.

12. A method as in claim 11 wherein passing communications between the first storage processor and the second storage processor includes:
    exchanging data between the first and second processors through the second set of ports of the packaged integrated circuit device to mirror caches of the first and second processors.

13. A method as in claim 10 wherein the second storage processor includes another packaged integrated circuit device which is configured to operate as a SATA initiator device with respect to the disk drives to control the disk drives as SATA target devices; and wherein passing communications between the first storage processor and the second storage processor through the second set of ports of the packaged integrated circuit device includes:
    operating the packaged integrated circuit device of the first storage processor as a SATA initiator device with respect to the other packaged integrated circuit device of the second storage processor to command the other packaged integrated circuit device of the second storage processor as a SATA target device.

14. A method as in claim 13 wherein passing communications between the first storage processor and the second storage processor through the second set of ports of the packaged integrated circuit device further includes:
    operating the packaged integrated circuit device of the first storage processor as a SATA target device with respect to the other packaged integrated circuit device of the second storage processor to respond to the other packaged integrated circuit device of the second storage processor when the other packaged integrated circuit device of the second storage processor operates as a SATA initiator device to provide peer-to-peer communications between the first and second storage processors.

15. A method as in claim 10 wherein the second storage processor includes another packaged integrated circuit device which is configured to operate as a SATA initiator device with respect to the disk drives to control the disk drives as SATA target devices; and wherein passing communications between the first storage processor and the second storage processor through the second set of ports of the packaged integrated circuit device includes:
    operating the packaged integrated circuit device of the first storage processor as a SATA target device with respect to the other packaged integrated circuit device of the second storage processor to respond to the other packaged integrated circuit device of the second storage processor when the other packaged integrated circuit device of the second storage processor operates as a SATA initiator device.

16. A method as in claim 15 wherein configuring the packaged integrated circuit device of the first storage processor includes:
    disabling a mechanism, which otherwise forces the packaged integrated circuit device of the first storage processor to operate as a SATA initiator device, to allow the packaged integrated circuit device of the first storage processor to operate as the SATA target device with respect to the other packaged integrated circuit device of the second storage processor.

17. A method as in claim 10 further comprising mirroring, by the processing circuit, cached data between the first storage processor and the second storage processor via the CMI links formed between the second set of ports of the packaged integrated circuit device of the first storage processor and the second storage processor.

* * * * *